Figure 5:
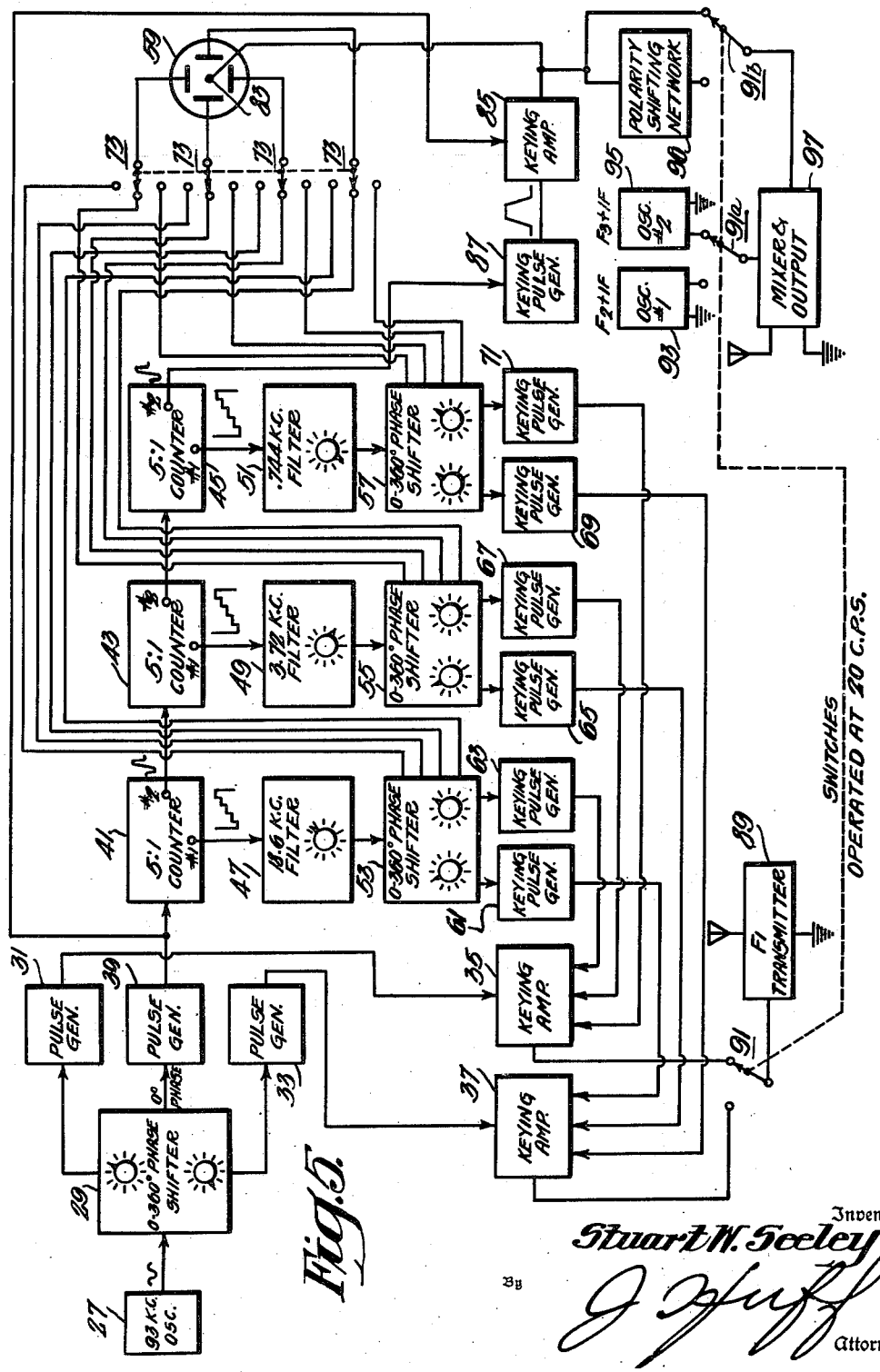

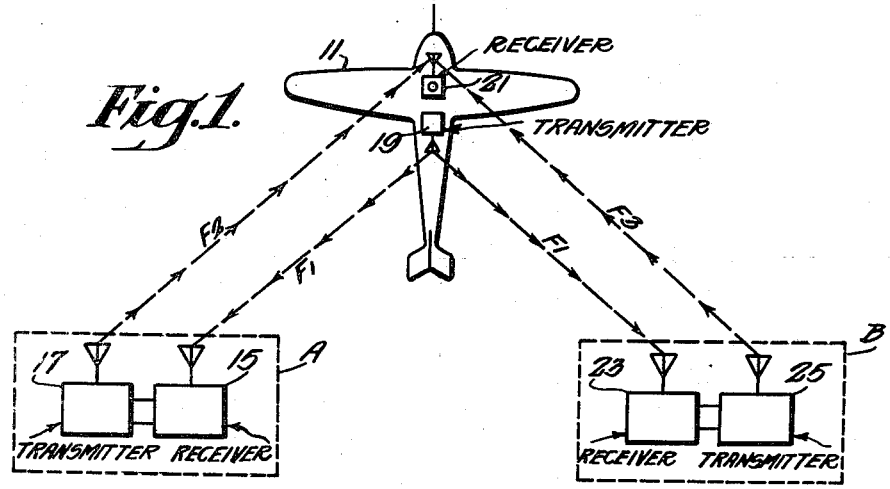
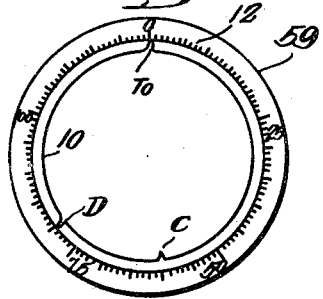
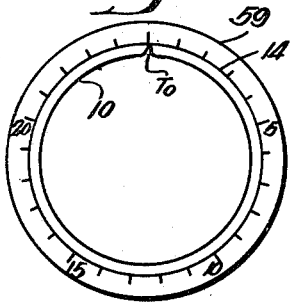
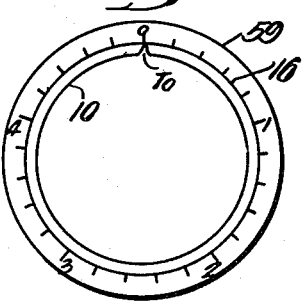
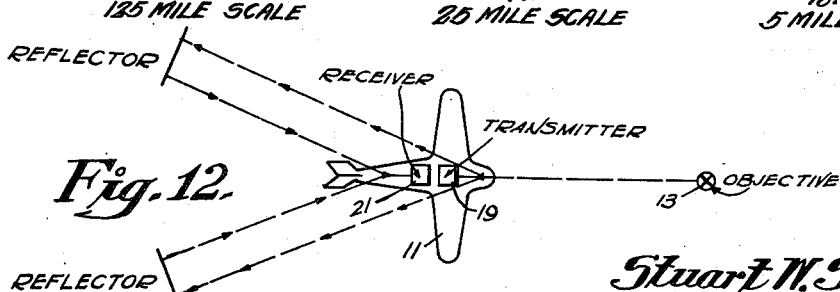

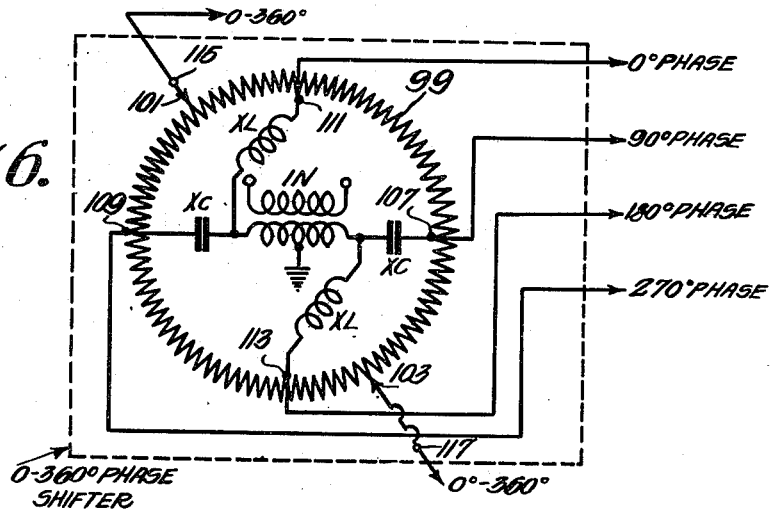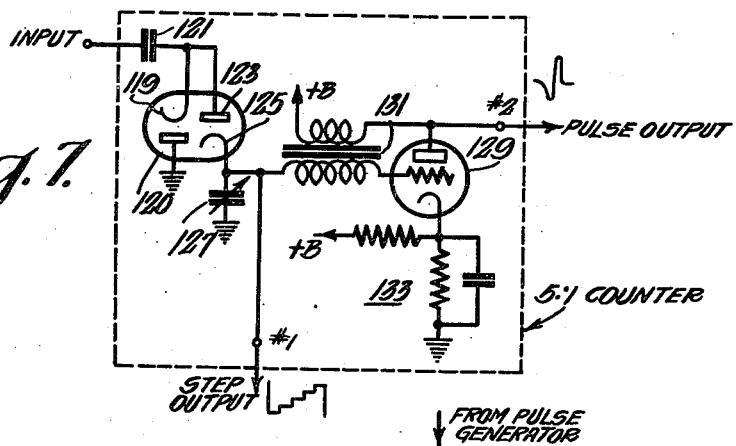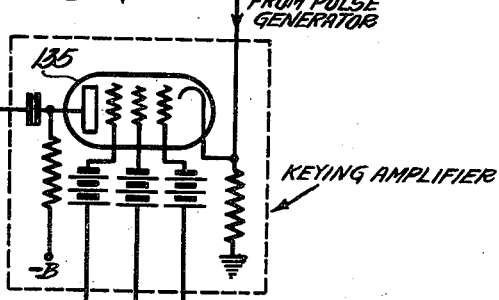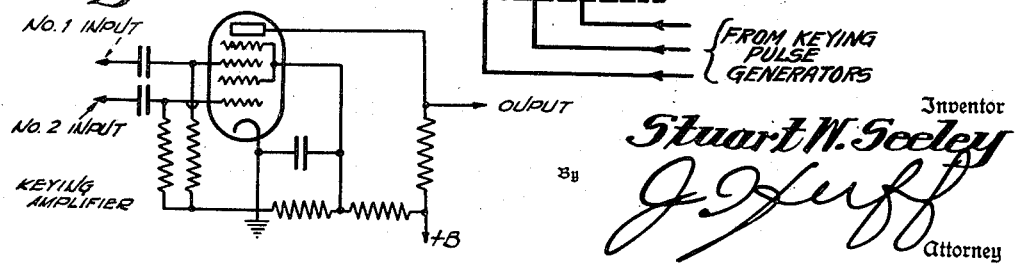

Aug. 6, 1946.  S. W. SEELEY  2,405,239
POSITION DETERMINING SYSTEM
Filed Feb. 28, 1941  4 Sheets-Sheet 4

Inventor
Stuart W. Seeley
By
Attorney

Patented Aug. 6, 1946

2,405,239

UNITED STATES PATENT OFFICE 2,405,239

POSITION DETERMINING SYSTEM

Stuart W. Seeley, Roslyn Heights, N. Y., assignor to Radio Corporation of America, a corporation of Delaware Application Februaray 28, 1941, Serial No. 381,020

15 Claims. (Cl. 250—1)

This invention relates to a system for and method of accurately determining the instantaneous distance of a movable object from one or more reference points whose locations are known. More particularly, it relates to a radio control system by means of which a movable object may be guided or navigated directly to a predetermined objective. By the term "movable object" is meant any aircraft, ship, submarine, motor vehicle, or the like.

The invention is particularly useful in the direction of the flight of an airplane to a position directly above a predetermined objective, such as an airport, city, cross-road, bridge or the like, and a particular application of this nature will hereinafter be described, although it is to be understood that the invention is not limited to the particular application disclosed.

In a copending application Serial No. 329,434, filed April 13, 1940, I have disclosed a position determining system in which the distance of an aircraft from two ground stations is continuously and accurately indicated by means of a device which measures the time required for a pulse transmitted from the aircraft to travel to each of the ground stations and return. The present invention operates on the same basic principle but embodies various improvements which greatly reduce the size and weight of the apparatus required, and which employs a somewhat different type of indicator. The present system is similar to that of the aforesaid application in that it is entirely free from errors due to "night effect" and requires no calculations by the pilot during his flight.

It is the principal object of this invention to provide an improved distance or position determining system which is free from the errors of the previously known systems, and which utilizes a minimum amount of apparatus. Further objects are to provide an improved position indicator of the type described in my copending application; to provide an improved indicator including a cathode ray tube which is somewhat easier to read than the previous type; and to provide an improved navigation instrument.

In accordance with the present invention, the above objects are attained by radiating from the aircraft a series of extremely short pulses of radio frequency energy, receiving the radiated pulses at two ground or base stations, utilizing the received pulses to cause a pulse of a different radio frequency to be radiated from each of the ground stations, receiving separately the reradiated pulses and measuring alternately the time interval between the transmission and the return of each pulse as a measure of the distance from the aircraft to each of the ground stations. A particular advantage of the present system is that it depends for its operation upon the invariable velocity of propagation of radiant energy. As a result, the accuracy of the system exceeds that of all previously known systems, with the exception of that described in my above-identified copending application.

The indicator herein proposed comprises a cathode ray tube which may be connected to any one of three voltages having different frequencies to provide progressive indications on a circular scale which corresponds, for example, to total ranges of 125 miles, 25 miles, or 5 miles, so that the pilot may select the proper scale as he approaches his objective. While the particular range corresponding to a given scale is largely a matter of choice, I have selected a convenient value which is so related to the velocity of propagation of radiant energy that the circular scale in the highest range corresponds exactly to 125 miles, while each of the other ranges increases the accuracy of the reading by five times; that is, when the pilot comes within approximately twenty-five miles of his objective, he sets the selector switch to its second position so that the circular scale then represents a distance of twenty-five miles. This scale is utilized until the pilot is within approximately five miles of his objective, at which time the selector switch is placed in its third position, and the circular scale then represents a distance of five miles. The circular trace of the cathode ray is deflected radially to provide a reference or index mark and two other distinguishable position indications which correspond, respectively, to the distance of the airplane from the two ground stations. As the plane is flown along its course, the two position indications move around the circular scale, and, when they both coincide with the initial reference mark, the pilot knows that he has reached his destination.

As indicated above, the two ground or control stations are located at predetermined points which are accurately known. The control stations may be located at permanent positions, or they may be in trucks or other vehicles so as to be movable to new locations as conditions change. The only requirement is that the control stations must remain fixed during any given flight.

While I have indicated above that the radiated pulse is received and reradiated from each ground station, an alternative arrangement would be that of reflecting the radiated pulses without actual reception and retransmission, as indicated diagrammatically in Fig. 12 of the accompanying drawings. In this application, the term "reradiation" is therefore, intended to cover both of these alternatives.

The invention will be better understood from the following description when considered in connection with the accompanying drawings, and its scope is indicated by the appended claims.

Figure 9:
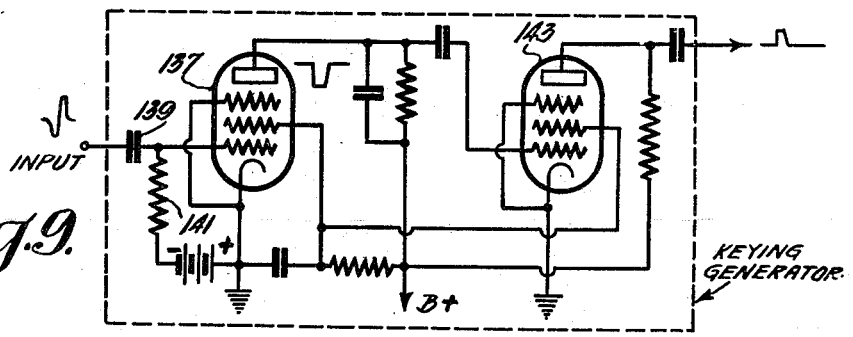
Figure 10:
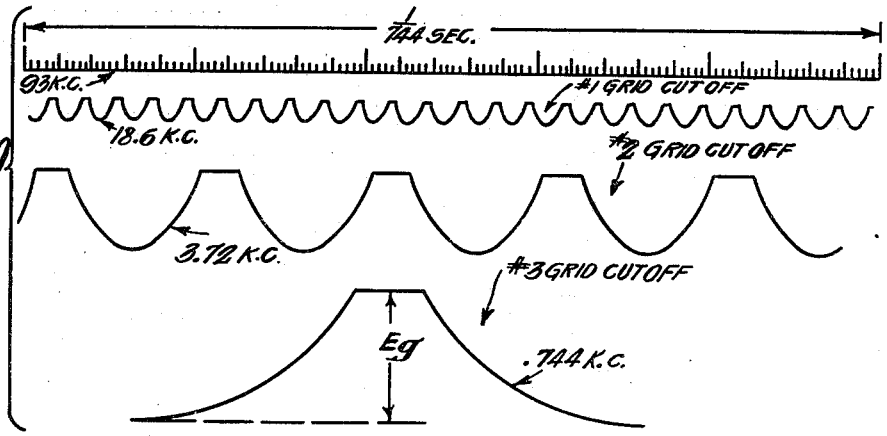
Figure 11:
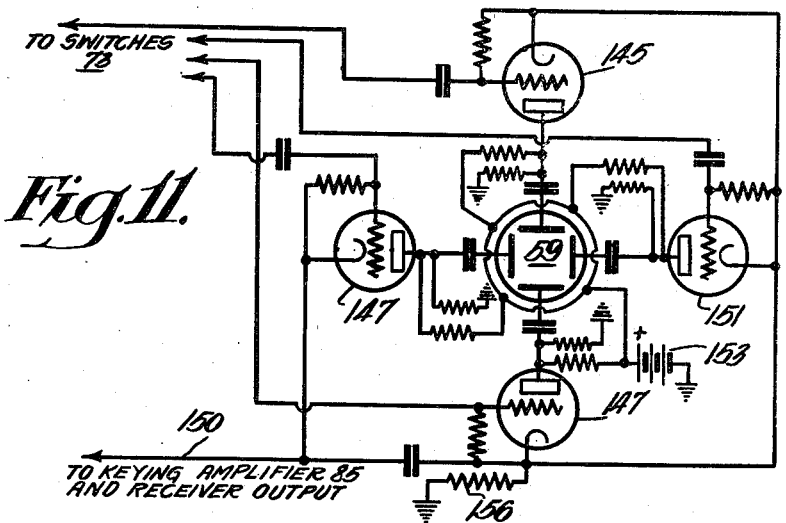

Referring to the drawings, Figure 1 is a sketch indicating the general system including the ground station receivers and transmitters and the airplane equipment; Figures 2, 3 and 4 are sketches illustrating the three cathode ray scales which are utilized; Figure 5 is a block diagram of the equipment which is mounted in the aircraft; Figure 6 is a wiring diagram of a 0-360-degree phase shifter; Figure 7 is a circuit diagram of a 5:1 frequency counter; Figure 8 is a circuit diagram of a keying amplifier; Figure 9 is a circuit diagram of a keying pulse generator; Figure 10 is a diagram illustrating the method of selecting a desired one of successive groups of impulses; Figure 11 is the circuit diagram of an alternative deflecting system; Figure 12 is a diagrammatic diagram of a system in which wave reflectors are used in place of relay stations; and Figure 13 is a circuit diagram of a keyer amplifier.

Referring to Fig. 1, reference numeral 11 indicates an aircraft which is flying to an objective 13. Ground station A includes a radio receiver 15 coupled to a radio transmitter 17. The receiver 15 is tuned to the frequency F1, which is the frequency radiated by the pulse transmitter 19 located on the airplane. The received pulse is utilized to key the transmitter 17 which then reradiates a similar pulse at a frequency F2. This frequency is received on the airplane by the receiver 21, the details of which will be explained subsequently. At the same time, receiver 23 at ground station B receives the same impulse on a carrier frequency F1 and similarly uses the impulse to cause a transmitter 25 to reradiate a pulse on a frequency F3.

It will be appreciated that a certain time will be required for the received pulse to actuate the receiver and transmitter and to initiate the reradiation of a secondary pulse. This time delay can be measured by any well-known method. Before starting on a flight, the equivalent distance for each ground station must be calculated. The equivalent distance is the distance a pulse would travel in the delay time of the ground station. One half of this value should be added to the actual distance between the ground station and the objective. In calibrating the instrument, the pulses will be radiated sooner by an amount required to compensate for the fixed time delay. In practice, this correction may be negligible. The distance from the objective to the two ground stations need not be the same, since separate indications are provided indicative of the position of the aircraft with respect to each ground station.

A cathode ray tube is employed to measure the time required for a pulse to travel from the plane to each ground station and back. Referring to Fig. 2, I have illustrated the face of a cathode ray tube, the beam of which is rotated at a rate of 744 cycles per second by means of quadrature voltages of suitable frequency to produce a circular trace 10. The tube is provided with means for producing a synchronized radial deflection $T_0$ of the rotating beam at the successive time periods which mark the beginning of each cycle. This deflection produces a mark on the cathode ray which is stationary. When the rate of rotation of the beam is 744 cycles per second, one complete revolution is accomplished in the time required for a pulse of radio energy to travel two hundred and fifty miles, which is the equivalent of the time required for a pulse to travel to a ground station one hundred and twenty-five miles away and back. Consequently, the complete scale represents a distance of one hundred and twenty-five miles. If the indicator is to be used over a distance in excess of one hundred and twenty-five miles, it will be necessary to add this distance to the indicated mileage. However, ordinary position indicators are accurate enough to determine the position of the plane within one hundred and twenty-five miles so that there is little danger of the pilot's becoming confused as a result of this ambiguity.

Assuming clockwise rotation of the beam, and also assuming that a pulse is radiated from the aircraft at the time $T_0$, and that the aircraft is within one hundred and twenty-five miles of both ground stations, it will be appreciated that, if the received pulses are also utilized to produce differently directed radial deflections of the beam, there will appear on the circular trace two radial deflections C and D, whose positions measure the time distance from the craft to each ground station. Neglecting the time delay in the retransmission from ground station A, the distance from the craft to this ground station is seen to be sixty miles, while the distance to ground station B, indicated by the deflection D is eighty miles. In this case, each small division of the scale represents one mile.

This system may be utilized as a navigation instrument to measure the distance of the plane in flight from one or more ground stations, simultaneously or successively, the position of the second pulse on the calibrated scale 12 indicating the actual mileage from the plane to the ground station. Such a system does not give the extreme accuracy which is possible with this instrument, since the distance cannot be read accurately on such a large scale. To realize the full advantage of the system, the instrument is preferably used as a flight control instrument to direct the airplane to a predetermined objective, in which case the accuracy of the scale 12 may be increased as the plane approaches its objective. In accordance with this preferred method, I propose to delay the transmission of the pulse from the airplane transmitter until such a time that it will traverse the distance between the objective and the ground station and will arrive back at the aircraft at a time which coincides with the position of the initial impulse $T_0$. It will be appreciated that this transmission time must be corrected in each case to allow for time delay of reception and retransmission, if any. Thus, assuming the objective is sixty miles from ground station A and eighty miles from ground station B, a first pulse is radiated to ground station A at a time interval after the initial time $T_0$ such that the received pulse will actuate the cathode ray just as the beam completes one complete revolution. A second impulse is radiated at alternate intervals to the ground station B at a different time after the initial period $T_0$, such that the pulse covers the eighty mile distance and returns to the receiver to cause a different or distinguishable radial deflection of the beam as it completes another of its revolutions. In such a case, the position indicating pulses will each coincide with the objective pulse. The advantage of this system is that the pilot need only fly the plane until the three pulses are superimposed, and it is not necessary for him to attempt to read the scale or calculate his position.

In Fig. 3, there is indicated a scale 14 for which the cathode ray beam is rotated at a frequency of approximately 3.72 kc. per second, which is five times the rate of rotation in the case previously discussed. As a result, a pulse can travel only one-fifth the distance in one rotation of the cathode ray beam, so that the scale covers a range of twenty-five miles, and each quintant represents a distance of five miles. The operator may switch this scale into use when he is within approximately twenty-five miles of his objective in order to provide greater accuracy in determining the alignment of the various impulses.

Fig. 4 is a third scale 16 for which the cathode ray beam rotation is accomplished at a rate of approximately 18.6 kc. per second, five times the rate of the previous case. In this instance, the complete scale corresponds to a distance of five miles, while each quintant represents one mile. It will be appreciated that the accuracy of alignment of the deflections is, therefore, considerably better than one mile; in fact, an accuracy of the order of several hundred feet has been obtained.

While I have shown three different scales calibrated in actual miles, for simplicity the indicator is preferably provided with a single scale of transparent material, for example, placed over the cathode ray screen, divided in any convenient manner, a multiplying factor being used to obtain the actual reading, the factor depending upon the position of selector switch which determines the frequency of rotation of the beam.

In Fig. 5 I have shown a block diagram of a receiver and indicating circuit, and means for timing the transmission of pulses in accordance with the preferred modification discussed above. Reference numeral 27 indicates an oscillator whose frequency is accurately controlled at approximately 93 kc. per second. The actual figure is the exact speed of light divided by 2. For convenience in this application, the speed of light is taken as 186,000 miles per second. The sine wave output of this oscillator is applied to the input of a 0–360-degree phase shifter 29, the purpose of which is to provide two output voltages which may be manually adjusted in phase over a range of 360 degrees. A third output voltage is also provided which is a zero or reference phase voltage. The circuit of such a phase shifter is illustrated in Fig. 6 and will be described in detail hereinafter. Two adjustable sine wave voltages from the phase shifter 29 are applied to the input circuits of a pair of pulse generators 31 and 33. The function of the pulse generators is to distort the sine wave input and to produce a control impulse of the same phase having a somewhat narrower peak, which may take the form of a substantially rectangular wave voltage. The circuit diagram of such a pulse generator is well known and need not be described herein. The output voltages of the two pulse generators 31 and 33 are applied, respectively, to a pair of keying amplifiers 35 and 37. These keying amplifiers are preferably multigrid tubes of the type in which an output potential is obtained only when the potential of each of the grids exceeds a predetermined value.

The output of a third pulse generator 39 is applied to the input of a 5:1 counter 41. This counter may be of the type illustrated in Fig. 4 in my above-identified copending application, or it may be a modified form of the type illustrated in Fig. 7 of the present application. Two output terminals are provided at which different voltages are available. The No. 1 terminal provides a step voltage of one-fifth the input frequency, while the No. 2 terminal provides a derivative impulse of one-fifth the input frequency which is used to excite a second 5:1 counter 43. The No. 2 terminal of the second counter is likewise connected to a third 5:1 counter 45, of similar construction.

The No. 1 terminals of the counters 41, 43, and 45 are connected, respectively, to the input circuits of adjustable filters 47, 49, 51. Filter 47 is tuned to 18.6 kc., and its purpose is to smooth out the step voltage of that frequency derived from the counter 41. The filter 49 is tuned to 3.72 kc. and its purpose is to smooth out the step voltage derived from the counter 43. The filter 51 is tuned to .744 kc. and its purpose is to smooth out the step voltage derived from the counter 45. The filter output voltages from the three filters are applied to the input circuits of 0–360-degree phase shifters 53, 55 and 57, respectively, which are similar to the 0–360-degree phase shifter 29. The three phase shifters, however, are provided with four additional output terminals at which quadrature voltages are available, whose frequencies are, respectively, 18.6 kc., 3.72 kc., and .744 kc. These quadrature voltages are applied through suitable wires and a manually adjustable three position-four blade selector switch 73 to the deflecting electrodes of a cathode ray tube 59 to produce a circular trace in the conventional manner. In addition, two manually adjustable voltages are available from each phase shifter. The phases of these voltages may be shifted throughout one complete cycle at each of the above frequencies. These voltages are applied to the input circuits of six keying pulse generators 61, 63, 65, 67, 69 and 71, the purpose of each keying pulse generator being to distort the sine wave input voltage to produce a more sharply peaked voltage of the same frequency. The outputs of keying pulse generators 61, 65 and 69 are connected to three of the control grids of the keying amplifier 37, while the outputs of the keying pulse generators 63, 67 and 71 are connected to three of the control grids of the keying amplifier 35.

While there are various methods which may be employed to produce a radial deflection of the circularly deflecting cathode ray beam, I have shown a conventional method of applying the radial deflecting voltage to a centrally located deflecting electrode 83. While this method of producing a radial deflection requires a special cathode ray tube, a novel system, which employs a conventional tube, will be described in detail subsequently. The radial deflecting voltage is obtained from the output of a keying amplifier 85 which comprises a dual grid thermionic tube, one grid being energized by a voltage derived from the pulse generator 39 and the other grid being energized by an "unbiasing" voltage derived from a keying pulse generator 87, the input circuit of which is coupled to the No. 2 terminal of the counter 45. A keying amplifier suitable for use in this connection is illustrated by the circuit diagram of Fig. 13.

Reference numeral 89 represents a transmitter on the aircraft which radiates short pulses of radio energy of a frequency F1. As is well known, the duration of these pulses is very much less than the interval between successive pulses so that one pulse is radiated, reflected and received before a successive pulse is radiated. The transmitter 89 is modulated alternately by two pulses derived, respectively, from keying amplifiers 35 and 37. The alternate modulation by these pulses is accomplished by means of a mechanically driven or electronic switch 91 which is operated, for example, at a rate of approximately twenty cycles per second. Thus, for 1/40 of a second, the transmitter is modulated by pulses which are timed to measure the distance to ground station A, and, during the successive 1/40 of a second, the transmitter is modulated by pulses timed to measure the distance to ground station B.

In my copending application, two separate receivers were employed to receive the reradiated pulses from the two ground stations, since these pulses are of different frequencies for the purpose of identification. In the present invention, however, a substantial simplification is achieved by employing but a single R.-F., I.-F. and output system, the receiver being tuned successively to the two frequencies by switching the frequency of the local oscillator. In the latter example, separate local oscillators 93 and 95 are employed. These oscillators are alternately coupled to the mixer tube of the receiver by a section 91a of the switch 91 so that, when the pulse for ground station A is being radiated by the transmitter, the local oscillator frequency is selected at the value necessary to receive the reradiated pulses having a frequency of F2. Similarly, when the transmitter is radiating the other group of pulses for ground station B, the receiver is connected to the local oscillator generating oscillations of a frequency suitable to receive the transmission of a frequency F3 from the transmitter of ground station B. While I have illustrated separate oscillators and a mechanical switch, it will be appreciated that a single oscillator may be employed, and its frequency varied electronically by means of a reactance tube, or by any of the known means for varying alternately the oscillator frequency.

The output of the receiver 97 is also connected to the third section 91b of the switch 91, or its electronic equivalent, which, in one position, applies the output directly to the central electrode 83 of the cathode ray tube, and, in its other position, applies the output voltage to this anode through a polarity shifting network 96, such as a single stage amplifier. The purpose of this phase-shifting network is to invert the pulse corresponding to station A with respect to the pulse corresponding to station B for the purpose of identification, as indicated by C and D of Fig. 2.

Fig. 6 is the circuit diagram of 0–360-degree phase shifter. This device comprises a circular resistance 99 having separately adjustable movable contacts 101 and 103 each of which may be placed on any position of the resistance around its entire circumference. This is accomplished, for example, by winding a resistance wire around an annular insulating member, and providing rotatable contact arms which make contact with opposite edges of the annular member.

A pair of capacitors Xc are serially connected with the secondary of a transformer 105 between opposite points 107, 109, of the circular resistor. Conjugate points 111, 113 on the circular resistor (midway between the opposite points 107, 109) are each connected to the secondary of the transformer 105 through a pair of inductors XL. Quadrature output terminals are connected to the four conjugate points 107, 109, 111, 113 on the resistor. One of the terminal points 111 is selected as the zero phase reference voltage, while the other three, with respect to the first, are successively 90 degrees later in phase.

If the series resistance of the entire circular resistor 99 is equal to 10,000 ohms, it will be appreciated that the impedance between points 107 and 109 will equal 2500 ohms. A similar impedance will exist between the conjugate points 111 and 113. The values of the two capacitors Xc are selected so that, at the operating frequency, the capacitive reactance between the points of connection is also equal to 2500 ohms. So also, the total inductive reactance of the inductors XL is equal to 2500 ohms at the operating frequency. In such a case, a voltage is available at the output terminals 115 and 117, which may be varied in phase throughout 360 degrees with respect to the reference phase available at terminal 111.

Figure 7 illustrates a 5:1 counter the function of which is to reduce the frequency of the applied voltage to one-fifth of its original value. The negative voltage applied to the cathode 119 of a rectifier 120 causes a current to flow which charges the input capacitor 121. This capacitor then discharges through the electron path from anode 123 to cathode 125 and charges an adjustable capacitor 127. Each rectangular impulse, therefore, causes a charging current to flow into capacitor 127 and increases the potential across this capacitor by a small amount. This voltage is applied to the grid electrode of a discharge tube 129 through the primary of a transformer 131. The secondary of this transformer is connected between the plate of the discharge tube 129 and a source of positive potential such as a B battery or the like. Output terminal No. 2 is connected to the plate of the discharge tube 129. The cathode of this tube is provided with a fixed positive voltage by means of a divider 133. The No. 1 or step output terminal is connected to the cathode 125.

In operation, the fixed bias and the size of the capacitor 127 are selected so that the potential across the capacitor which is applied to the grid of the discharge tube reaches the critical value of the tube upon the application of the fifth charging cycle. When this occurs, the grid current discharges capacitor 127, while the sudden increase of plate current applies a regenerative voltage to the grid through transformer 131 which causes the tube to go to saturation immediately, and then return to its normal biased-off condition, since the grid voltage has now been reduced to zero. The output voltage on the No. 2 terminal is, therefore, a sharp negative pulse followed by a large positive pulse, the frequency of which is one-fifth that of the generator frequency. The output on the No. 1 terminal is a step voltage which builds up to a maximum in five steps and then is suddenly reduced to zero.

A keying amplifier is illustrated in Fig. 8. Since tubes having four grids are not generally available, I employ a three-grid tube 135 and apply the fourth control impulse from the pulse generator to the cathode. The grids are suitably negatively biased and are connected, respectively, to the keying pulse generators, while the output is derived in the conventional manner from the anode. It will be appreciated that the cathode receives a series of short pulses from the pulse generator which recur at a frequency of 93,000 per second, and that the phase of these pulses, with respect to the output of the oscillator 27, may be adjusted through a single cycle by the phase shifter 29. It is, of course, necessary to apply these pulses to the cathode in such a polarity that the cathode potential is made more negative. The negative potential on the cathode has the same effect as the application of a positive pulse to a normally biased grid. However, these high frequency pulses do not appear in the output circuit of the tube as long as any one of the grids is sufficiently negative to block anode-cathode current. The three grids are coupled to keying pulse generators which provide output voltages of frequencies related in ratios of 5:1. The operation of this tube is best explained by reference to Fig. 10 in which the first curve represents the number of pulses applied to the cathode in a time period equal to 1/744 of a second; the second curve represents the 18.6 kc. voltage applied to the first grid by the keying pulse generator 61; the third curve represents the 3.72 kc. voltage applied to the second grid by the keying pulse generator 65; and the fourth curve represents the .744 kc. voltage applied to the third grid by the keying pulse generator 69.

It will be observed from these curves that the .744 kc. voltage removes the initial bias $E_g$ to allow anode current to flow, so far as this grid is concerned, but once during this time period. The voltage $E_g$ represents the grid voltage applied to the No. 3 grid at the peak of the applied alternating voltage, which is just sufficient to permit operation in the manner described above. At the same time, the potential of the No. 2 grid is varying at a frequency five times that of the No. 3 grid, while the No. 1 grid is varying at a rate five times that of No. 2 grid. Within the given time period, all three grids are positive at but one instant. The amplitudes of these voltages, however, are not sufficient to cause output currents to flow in the plate circuit of the tube until the high frequency pulse reaches the cathode at the time X, thus causing a corresponding impulse to flow in the output circuit.

It will be appreciated that the 18.6 kc. voltage may be shifted through 360 degrees. The peak of this voltage may, therefore, be made to coincide with any one of the impulses within a period corresponding to the period of adjustable voltage. Furthermore, the 3.72 kc. voltage may be moved through 360 degrees so that its peak may be aligned with any one of the peaks of the 18.6 kc. voltage within a period corresponding to the period of the adjustable voltage. Likewise, the peak of the .744 kc. voltage may be made to coincide with that of any one of the peaks of the 3.72 kc. voltage. The net result of the three adjustments, therefore, is that in each time interval of 1/744 second a single one of the 125 pulses derived from the pulse generator 33 may be selected. Since this time interval corresponds to the time required for the cathode ray to trace one complete circle on the screen, it will be appreciated that selected pulses are radiated once during each revolution of the cathode ray beam, and that a stationary pattern is, therefore, produced. Since the operation of the switch 73 increases the rate of rotation of the beam by even multiples of five, the indicator at all times is synchronized with the pulse radiation and reception, and a stationary pattern is produced.

The voltages from the keying pulse generators, shown in Fig. 10, have a flat top form which is produced by distorting sine waves. The purpose of this is to make the adjustment of the instrument easy. Thus the .744 kc. curve can be moved in phase through a considerable angle before the peak of the curve is displaced far enough to cause a different one of the 3.72 kc. peaks to be selected. Thus, if the 0-360-phase shifter 69 is varied plus or minus approximately 37½ degrees, the peak will still select the same peak of the higher frequency curve. The same thing is true with respect to each of the other control voltages.

In my copending application, it is necessary to utilize a 0–7$\mu$-second time delay network to obtain a pulse at the required time. One of the advantages of the present system is the elimination of this delay network. In the present case, all the selection is accomplished by easily constructed noncritical phase shifters, the greatest phase shift being 360°.

The reference pulse which produces the objective index $T_0$ on the cathode ray screen is applied to the radial deflecting electrode 83 through the keying amplifier 85 which is controlled by a pulse generator 87. Since the input of the pulse generator is controlled by the output of the counter 45 operating at .744 kc., an unblocking pulse from the generator 87 is applied to the No. 2 grid of the keying amplifier once during each revolution of the cathode ray beam. The pulse generator 87 is preferably designed so that a positive pulse whose duration is approximately 10 microseconds is produced. Thus, the keying amplifier is able to pass the pulse applied to it from pulse generator 39 once during each revolution of the cathode ray beam, but because the interval between the high frequency pulses from the pulse generator is approximately 1/93,000 of a second, and the duration of the control pulse is 1/100,000 of a second, it will be seen that each unblocking pulse from the generator 87 will permit but one pulse from the high frequency timing source to pass. This timing pulse deflects the beam radially at a time $T_0$ to produce the indexing mark to which the indications corresponding to the airplane's position are aligned.

Figure 9 is a keying pulse generator suitable for use in the circuit as indicated. This is merely a differentiating circuit including a tube 137 and input elements 139–141 the time constant of which is adjusted in the manner described above to produce an output impulse whose duration does not exceed 10 microseconds. Tube 143 is a limiter and polarity reverser to produce a flat top pulse of the required duration.

Before operating the device, it is necessary to make several initial adjustments to align the reference index on each of the ranges. Placing the contact arms of switch 73 on the lower terminals or first position connects the deflecting electrodes to phase shifter 57. There will be a certain phase relation between the beam rotation and the indexing impulse selected and applied by keying amplifier 85. The entire cathode ray tube may be rotated or the filter 51 may be adjusted, or both, until the index mark $T_0$ is at the top of the screen, or at any other convenient position. Next, the switch 73 is placed in the second position; the filter 49 is then adjusted, thus varying the phase of the quadrature voltages with respect to the timing pulse, until the index mark is again in the desired position. This process is repeated for the third switch position by adjusting the corresponding filter 47, so that the index mark does not move when the switch 73 is in any of its three positions. The instrument is then ready for use.

Each of the 0–360° phase shifters is calibrated in terms of miles or fractions thereof. The control knobs of the low frequency shifter 57 are calibrated in 25-mile steps from 0 to 125 miles. No greater accuracy is needed here because, as pointed out above, each selecting voltage need only be set within ±37.5° of its scale. The control knobs of the midfrequency shifter 55 are calibrated in 5-mile steps from 0 to 25 miles, the control knobs of the high frequency shifter 53 are calibrated in 1-mile steps from 0 to 5 miles, while the control knobs of the phase shifter 29 are calibrated in fractions of a mile from 0 to 1 mile.

Having determined the distance from the objective to station "A" to be, for example, 108.7 miles, set the "A" dial of phase shifter 57 to the largest multiple of 25 within this distance (that is, 100 miles), and find the difference between this multiple and the total distance, which is 108.7 miles minus 100 miles, or 8.7 miles. Set the "A" dial of phase shifter 55 at the largest multiple of 5 within this remainder (that is, 5 miles), and find the remainder, which is 3.7. Again set the dial "A" of phase shifter 53 to the largest multiple of 1 within this remainder, 3 miles, and find the remainder again, which is now 0.7. Finally, the last remainder is set on the "A" dial of phase shifter 29. When this is done, the pulse is automatically selected which will be transmitted at the proper time to go to station "A" from the objective point and back in the calculated time, and will deflect the rotating beam at the exact instant it coincides with the index impulse To.

The same process is then repeated for ground station B, utilizing the low, intermediate, and high frequency phase shifters to select the timing pulse nearest the calculated time distance from station B to the objective and adjusting the remaining section of phase shifter 29 to provide the correct timing corresponding to distances within one mile.

The system is then set in operation, automatically transmitting and receiving groups of pulses alternately with respect to stations A and B, and the pilot begins his flight towards his objective. Switch 73 is placed in its first position, and the circular scale then represents a distance of one hundred and twenty-five miles. An inwardly and outwardly extending position indicating pulses C and D will be observed on the circular scale, and the fixed reference pulse To will also be present. The pilot directs his craft toward the objective, the two position-indicating pulses moving slowly around the circular scale approaching the objective or index mark. When both of these pulses are within the quintant nearest the objective mark, the accuracy of indication is increased by placing switch 73 in its second position. This extends the scale to a total of 25 miles, and the pilot continues to fly his course as above. When they again both fall within the quintant nearest the objective, switch 73 is set to its third position, giving the greatest accuracy for the indicator, and the flight is continued until the two position markers coincide exactly with the objective index, at which time the pilot has reached his objective. To reach a second objective, the adjusting dials may immediately be reset for the new "time distances," and the plane directed to the new objective in the same manner. On the return flight, the instrument may be used as a navigation instrument, or it can be used to return the pilot to his home base in the same manner.

Figure 11 is a circuit diagram of an alternative cathode ray deflecting system which employs a conventional cathode ray tube. The advantage of this system is that a tube having an auxiliary deflecting electrode is not required, but its disadvantage is that it employs additional tubes.

The four deflecting electrodes of the cathode ray tube 59 are capacitively coupled to the plate electrodes of thermionic triodes 145, 147, 149 and 151, respectively. Plate voltage for the four tubes is supplied by means of a common battery 153 through shunt connected resistors in the conventional manner. The cathode electrodes of the four tubes are connected together and are connected to ground through a common biasing impedance 155. Input from the keying amplifier 85, of Fig. 5, and also the output of the receiver 97 are applied to the deflection system by a connection 150 between the output of the amplifier 85, and the receiver output and the four cathode electrodes. The four quadrature voltages from the switch 73 are coupled, respectively, to the grid electrodes of the four thermionic tubes.

The operation of this system is based upon the difference in mutual conductance of two tubes when their grid voltages are varied. For example, assuming tube 147 to be momentarily nonconducting and its plate voltage at a maximum positive potential, at the same instant the opposite tube 151 will be conducting and its plate voltage will be a minimum. The electron beam will, therefore, be deflected horizontally to the left. At the same instant, equal potentials are applied to the vertical deflecting tubes 145 and 149 and their plate voltages are therefore equal. In this condition, assume that a negative impulse is applied to the cathode electrodes of the four tubes. This is equivalent to the application of a positive impulse to the four grids. Since the vertical tubes are operating under similar conditions, as noted above, their mutual conductances are identical and the decrease in plate voltage of tube 145 has an equal and opposite effect to the decrease in plate voltage of tube 149. Consequently, the impulse produces no vertical deflection on the cathode ray beam. The horizontal tubes, however, are operating under opposite conditions of conductivity. As a result, their mutual conductances are different, and, therefore, the effect of the pulse on the two tubes is not the same. The tube 147 which is nonconducting has a much greater mutual conductance than tube 151. Consequently, the negative pulse applied to its cathode causes a greater increase in the plate voltage than the same pulse applied to tube 151. The result of this is that the cathode ray beam is momentarily deflected in a horizontal direction. It will be observed that the relative mutual conductances of the tubes depends upon their operating condition, and that, at any instant, the application of a control pulse to the cathodes of the tubes will result in a radial deflection of the beam.

While I have illustrated this invention by the use of triode deflecting tubes, it is to be understood that dual grid tubes may be employed for the same purpose.

I claim as my invention:

1. The method of indicating the distance between a transmitter and receiver at a first location and a relay at a second location which includes the steps of drawing cyclically repetitive time measuring scanning lines, producing a reference index mark on said line corresponding to the beginning of each of said scanning cycles, radiating from the first location pulses of radio frequency energy at spaced intervals synchronized with said scanning cycle, reradiating said pulses from the other location, receiving said reradiated pulses, producing as a function of said received reradiated pulses a second index mark on said scanning line, and adjusting the time of transmission of said pulses so that the position of said second index mark coincides with that of said reference index at said distance.

2. The method of indicating the distance between a transmitter and receiver at a first location and a relay at a second location which includes the steps of drawing a circular scanning line, producing a fixed reference mark on said line corresponding to the beginning of each scanning circle, radiating from the first location pulses of radio frequency energy at spaced intervals synchronized with said scanning line, reradiating said pulses from the other location, receiving said reradiated pulses, producing as a function of said received reradiated pulses a second mark on said scanning line, and adjusting the time of transmission of each of said pulses to a predetermined known time before the occurrence of the successive reference marks such that said second mark coincides with said reference mark at said distance.

3. The method of indicating the distance between a transmitter and a control station which includes the steps of producing a cathode ray beam, rotating said beam over a fluorescent screen to produce a circular trace, modifying said trace synchronously with the rotation of said beam to produce a reference mark, radiating pulses of radio frequency energy at spaced intervals synchronized in frequency with the frequency of rotation of said beam, reradiating said pulses from said control station, receiving said radiated pulses, producing in response to said received pulses a distinguishable position indicating mark, and adjusting the time of transmission of each of said pulses to a predetermined time before the occurrence of said reference marks so that said position indicating mark coincides with said reference mark at said distance.

4. The method of measuring the distance between a transmitter and receiver at a first location and a relay at a second location which comprises producing a succession of spaced pulses, selecting pulses spaced apart a time not less than the time required for a pulse to travel twice the distance between said locations, producing a reference indication in response to alternate pulses, applying to the transmitter intermediate pulses to control the radiation of a pulse of radio frequency energy from one of said positions, reflecting said radiated pulse from the other of said positions, receiving said reflected pulse at said first position, producing an indication corresponding to said received pulse, and determining said distance by comparing said indications.

5. The method of measuring the distance between a transmitter and receiver at one position and a relay located at another position which comprises producing a succession of high frequency pulses, deriving low frequency synchronized pulses therefrom, combining said high frequency and said low frequency pulses to select desired ones of said high frequency pulses, deriving reference pulses from said high frequency pulses, radiating said selected pulses from one of said positions, reradiating said pulses from the other of said positions, receiving said reradiated pulses at said one position, and indicating the time of arrival of said reflected pulses with respect to said fixed reference pulse.

6. The method of measuring the distance between a transmitter and receiver at one position and a relay at another position which comprises producing a succession of high frequency pulses, deriving low frequency pulses therefrom, combining said high frequency and said low frequency pulses to select desired ones of said high frequency pulses, producing a cathode ray beam, rotating said beam synchronously with said low frequency pulses to produce a circular trace, modulating said beam synchronously with said rotation to produce a reference mark on said trace, radiating said selected pulses from one of said positions, reradiating said pulses from the other of said positions, receiving said reradiated pulses at said one position, and applying to said cathode ray said received pulses to modulate said trace and produce a second mark on said trace, the distance between said marks being a measure of the distance between said positions.

7. The method of directing a movable object carrying a transmitter and receiver to an objective which is a given distance from a fixed base station including a relay which includes the steps of producing a cathode ray beam, rotating said beam to produce a circular trace, pulse modulating said beam to produce a fixed objective index on said trace, transmitting from said transmitter pulses of radio frequency energy synchronized with the rotation of said beam, said transmitted pulses occurring at a time interval before each indexing pulse corresponding to the time required for a pulse of radio frequency energy to travel from the object when over said objective to said base station and return, reradiating said transmitted pulses from said base station, receiving said reradiated pulses on the object, and modulating said trace by said received pulses to produce a position indicating mark on said trace whereby the superposition of said mark and said index indicate that the pulse propagation time required to travel said given distance has been reached.

8. The method of directing a movable object carrying a transmitter and receiver to an objective which is a predetermined distance from two fixed base stations each including relays which includes the steps of producing a cathode ray beam, rotating said beam to produce a circular trace, pulse modulating said beam to produce an objective index on said trace, alternately transmitting from said transmitter different pulses of radio frequency energy which are synchronized with the rotation of said beam, said different pulses being timed to occur at time intervals before each successive indexing pulse corresponding, respectively, to the times required for a pulse to travel from said objective to said base stations and return, reradiating said transmitted pulses from said base stations, receiving separately on the object said reradiated pulses, and modulating said beam by said received pulses to produce a pair of position indicating marks on said trace, and directing said object toward said objective until said position indicating marks coincide with said index impulse.

9. In a system for indicating the distance between a movable object carrying a transmitter and receiver and a fixed base station including a relay the method of operation which includes the steps of producing high frequency pulses, deriving a plurality of successively lower submultiple frequency pulses synchronized with said high frequency pulses, independently controlling an electron stream by said pulses, varying the phase of each of said submultiple frequency pulses to select desired ones of the higher frequency pulses to thereby select a single high frequency pulse for each cycle of the lowest submultiple frequency, radiating from said movable object a pulse of radio frequency energy timed by said selected pulse, reradiating said pulse from said ground station, receiving said reradiated pulse, and indicating the time difference between the reception of said reradiated pulse and a reference pulse synchronized with one of said submultiple frequencies.

10. In a system for indicating the distance between a movable object carrying a transmitter and receiver and two fixed base stations each including relays, the method of operation which includes the steps of producing a high frequency alternating voltage, deriving a plurality of successively lower submultiple frequency voltages from said high frequency voltage, deriving first and second voltages independently controllable in phase from each of said submultiple frequency voltages, deriving first and second voltages independently controllable in phase from said high frequency voltage, independently controlling separate electron streams by said first and second derived voltages, respectively, varying the phase of said voltages to select a desired portion of the high frequency voltage for each cycle of the lowest submultiple frequency, alternately radiating by means including the transmitter on the moving object pulses of radio frequency energy timed by said selected portions, separately receiving pulses reradiated from said base stations, and comparing the time of arrival of said reradiated pulses with a cyclic timing voltage to indicate said distance.

11. In a system for guiding a movable object carrying a transmitter and receiver to a predetermined objective which is a known distance from two base stations each including relays, the method of operation which comprises radiating alternately differently timed groups of pulses of radio frequency energy from said movable object, receiving and reradiating said pulses from said base stations, producing a timing line which scans successively a time period which includes the transit time of said pulses, producing on said timing line a fixed reference index, adjusting the time of transmission of said alternate groups of pulses with respect to said reference index so that pulses of each group precede said reference index by times determined by the distance of said objective from said base stations, receiving said reradiated pulses on said object, producing indications on said timing line of the time said pulses are received, and decreasing the scanning time of said timing line to increase the accuracy of indication as said movable object approaches said objective.

12. In a system for guiding an aircraft or the like to a predetermined objective, the combination including means located on said aircraft for alternately radiating groups of pulses on the same carrier frequency, means for receiving said pulses at a pair of ground stations located at known fixed positions, means for reradiating said pulses on different carrier frequencies from said ground stations, a receiver on said aircraft for receiving said reradiated pulses, means for cyclically varying the response frequency of said receiver between said two carrier frequencies synchronously with the alternation of said pulse groups, common means for independently timing the time of transmission of pulses in each of said groups; and means for applying said received reradiated pulses to said timing means to indicate the respective total propagation times of said groups of pulses.

13. A device of the character described in claim 12 in which said means for independently timing the transmission of said pulses includes a high frequency pulse generator, and means for selecting one pulse having the desired time relation to said common timing means.

14. A device of the character described in claim 12 in which said timing means includes a high frequency pulse generator, submultiple frequency pulse generators, and means for combining said high frequency pulses and the outputs of said submultiple frequency pulse generators to select a pulse from said high frequency generator having the desired time relation to said common timing means.

15. In a position determining system, the combination including a relatively high frequency oscillator, first phase shifting means coupled to said oscillator for deriving from said oscillator first and second output voltages of independently controllable phase, a cathode ray tube including deflecting electrodes, means for applying deflecting voltages to the deflecting electrodes of said tube to produce a cyclic line trace, said deflecting voltages being a submultiple frequency of said oscillator frequency, second phase shifting means for deriving third and fourth output voltages of independently controllable phase of said submultiple frequency, a transmitter located at the position to be determined, means for alternately modulating said transmitter by groups of selected pulses derived from said first and second output voltages, respectively, at times controlled by said second and third output voltages, means for radiating alternately said groups of pulses from said position to be determined, means for reradiating said pulse groups from remote points, means for receiving selectively said reradiated pulses at said position to be determined, and means for modulating said line trace by said received pulse groups to produce position index marks on said trace.

STUART W. SEELEY.